Oct. 12, 1965    K. SKARPAAS    3,212,035
MICROWAVE WAVEGUIDE COUPLING SEAL
Filed Dec. 20, 1963
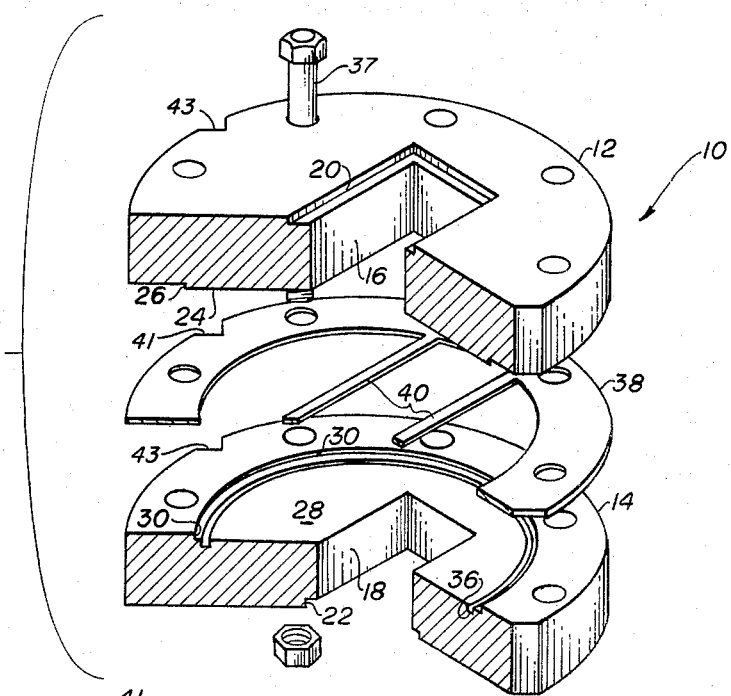
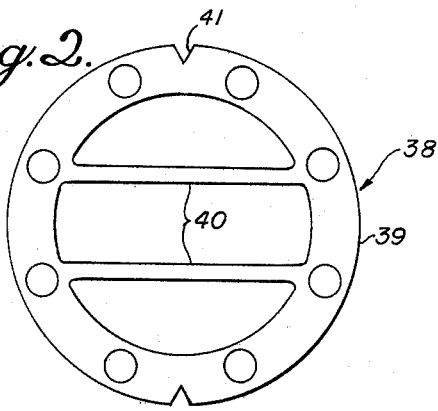
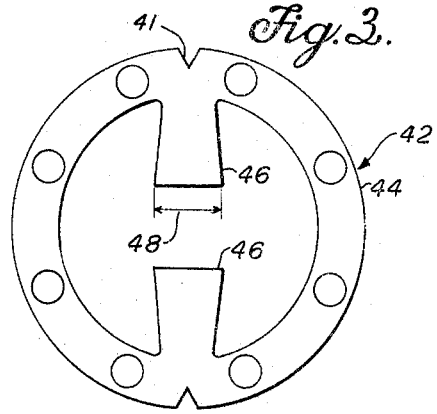
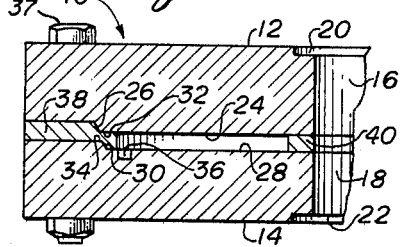
INVENTOR.
KNUT SKARPAAS
BY
ATTORNEY

United States Patent Office 3,212,035
Patented Oct. 12, 1965

3,212,035
MICROWAVE WAVEGUIDE COUPLING SEAL
Knut Skarpaas, Palo Alto, Calif., assignor to the United States of America as represented by the United States Atomic Energy Commission
Filed Dec. 20, 1963, Ser. No. 332,315
4 Claims. (Cl. 333—98)

The present invention relates generally to a waveguide coupling seal and in particular to a coupling including a flanged joint sealed by an especially adapted gasket and seat arrangement particularly designed to provide not only optimum vacuum sealing characteristics but also optimum radio-frequency characteristics in a microwave waveguide.

Various gasket and flange combinations are well known for providing a joint or waveguide seal capable of securing two lengths of waveguide together while preserving not only the vacuum conditions therein but also facilitating the transmission of microwave power therethrough. Such gasket and flange combinations have been utilized, for example, in waveguide systems for transmitting microwave power from klystron tubes to accelerator vacuum systems or to radar systems. It is imperative that the gasket-flange combination exhibit optimum high-frequency power transmission characteristics therethrough with a minimum of power losses or mismatching, which effects would cause deterioration of the transmission characteristics of the power delivering waveguide system. There are numerous waveguide vacuum seals which provide average vacuum sealing characteristics but there are few waveguide seals which provide ultra-high vacuum sealing characteristics while simultaneously exhibiting the necessary power transmission characteristics necessary for delivering extremely high, radio-frequency power to a power consuming device.

The present invention however, overcomes the above-noted shortcomings of prior art waveguide coupling devices by providing a flange joint having an especially adapted configuration in combination with a particularly shaped gasket placed therebetween, whereby optimum vacuum and radio-frequency characteristics are provided.

Accordingly, it is an object of the present invention to provide a simple, reliable, and inexpensively constructed waveguide coupling seal for joining together two lengths of waveguide which are utilized to transmit microwave power to an evacuated power-consuming device.

It is another object of the present invention to provide an all-metal waveguide coupling seal capable of being baked to obtain effective outgassing.

It is still another object of the present invention to provide a waveguide seal which exhibits a relatively low voltage standing wave ratio for any frequency propagated, and which is capable of transmitting radio-frequency energy at high power levels, for example, 40 kw. average and 80 mw. peak powers.

It is yet another object of the present invention to provide a waveguide coupling seal capable of being repeatedly sealed while maintaining a vacuum of at least $10^{-8}$ torr after each assembly.

Still another object of the present invention is to provide a waveguide coupling seal utilizing a combination flange and gasket configuration wherein the gasket provides an uninterrupted contact surface between the abutting ends of two waveguide sections to facilitate low loss transmission of high-frequency power therethrough.

Other objects and advantages will be apparent in the following description considered together with the accompanying drawing in which:

FIGURE 1 is a perspective cross-section view showing the waveguide coupling seal of the present invention.

FIGURE 2 is a top view of the one embodiment of the gasket utilized in the waveguide seal of FIGURE 1.

FIGURE 3 is a top view of an alternative embodiment of a gasket which may be utilized with the flanges shown in FIGURE 1.

FIGURE 4 is an enlarged partial cross-section view of the waveguide seal of FIGURE 1 showing the gasket of FIGURE 2 in a compressed sealing disposition between the flanges of FIGURE 2.

Referring to FIGURES 1 and 4 there is shown a waveguide coupling seal 10 constructed in accordance with the invention and including mating plate members in the form of a male flange 12 and a female flange 14 of generally circular configuration disposed in facing, opposed, spatial relation. Flanges 12 and 14 are provided with rectangular apertures 16 and 18 respectively formed centrally therein, said apertures having dimensions identical to the inside dimensions of identical waveguides (not shown) which, in use, the waveguide seal is to connect. To provide for assembly and coupling the ends of the waveguides are suitably secured to the outer end surfaces of the flanges. Assembly may be effected, for example, by welding or brazing the ends of adjacent waveguide sections in continuous recesses 20, 22 which are formed into the flanges 12, 14, immediately about apertures 16, 18 respectively. When so disposed the apertures provide a uniform dimension extension of the waveguide interior walls.

To provide for effective sealing, the internal surface of the male plate flange 12 is constructed with a raised portion 24 which extends from the edge of aperture 16 radially outward to terminate in a depressed circular step 26; step 26 being formed generally concentrically within the overall outer circumference of the flange 12 and terminating thereat. As illustrated in FIG. 1, step 26 may be formed with an intervening surface portion in perpendicular relation to the raised surface 24 or preferably, as shown in FIG. 4, said intervening surface may be formed in beveled relation to the surface 24, i.e., at an angle thereto greater than 90°, and preferably at an angle of 20° or 21° with respect to the axis of the flanges. It is preferable to slant the step 26, to prevent the formation of air pockets and to provide guidance in assembly; likewise steps with square or vertical intervening surfaces tend to deform, dent or bend after several closures, whereas slanted steps are structurally stronger and more resistant to deformation, resulting in a longer life term for the waveguide coupling seal upon repeated assembly.

For the same purpose female flange 14 has formed therein a depressed generally planar surface 28, which extends from the edge of aperture 18 radially outward to terminate in a continuous circular elevated step 30. The step 30 is formed with an intervening surface portion into flange 14 in beveled relation to the depressed surface 28 and in generally concentric relation with the outer circumference of the flange 14. The radius of the circular step 30 of female flange 18 is slightly smaller than the radius of the step 26 of the male flange 12 as indicated in FIG. 4, thus providing an area of overlap between circumferential portion of said step. Such overlapping area, termed a step-tread 32 on the male flange 12, lies in opposed alignment with the overlapping area, termed a step-tread 34, of female flange 14, bordering the outer peripheral area of surface 28. The width of the overlap is selected to permit deformation of the gasket described hereinafter. A circular continuous pump-out groove 36 is formed into the surface 28 along generally the outermost extent thereof, and spaced a short distance radially inward from the step 30.

Sealing is effected by means of a circular gasket 38 made generally of a deformable metal, such as half-hard copper, disposed between medial surfaces of the facing flanges 12, 14. The gasket 38 of the present invention is particularly designed to provide a minimum area of gasket material contact when placed in position between the facing surfaces of the flanges 12, 14. As shown in FIG. 1 and particularly FIG. 2, one embodiment of the gasket 38 is in the form of a flat, annular ring 39 having an outside diameter substantially equal to the outside diameter of the flanges 12 and 14, and an inside diameter usually slightly smaller than the diameter of the circular step 30 of flange 14. In any case, the ring 39 should not extend radially inward to cover the pump-out groove 36. Optimum electrical contact between the flanges 12, 14 is obtained in accordance with the invention, by utilizing two electrically conductive strips 40 formed of gasket material similar to the material of ring 39. The strips are arranged to extend in parallel relation as chords of the ring 39, and are integrally secured at either end to the inner circumference of the ring 39. In practice, the gasket 38 is stamped in one piece from sheets of gasket material. The strips 40 are spaced from one another a distance equal to substantially the shortest inside dimension of the rectangular waveguide system, i.e., the shortest dimension of aperture 16, 18. As may been seen from FIG. 4, upon assembly of the gasket 38 between the flanges 12, 14, gasket strips 40 lie between the raised surface 24 and the depressed surface 28, and are so positioned such that the inside edges thereof lie substantially flush with the longer wall surfaces of apertures 16, 18. Thus, strips 40 provide not only good electrical contact between the flanges, but also provide an uninterrupted smooth transition surface between the flanges to prevent disturbing the propagated microwave field and thereby make possible an optimum transmission of microwave power therethrough.

An alternative gasket embodiment is shown in FIG. 3, such gasket 42 comprising essentially an outer, annular, flat ring 44 having dimensions similar to those of ring 39 of gasket 38. However, the strips 40 of the gasket 40 shown in FIG. 2 have been replaced by trapezoidal-shaped gasket projections 46 which extend radially inward generally symmetrical along a common diameter and which terminate in flat end edges. At such time as the gasket is assembled between flanges 12, 14, the flat end edges of the projections 46 lie substantially flush with the longer dimension of apertures 16, 18. Thus it may be seen that gasket 42 again provides a minimum amount of gasket contact with the flanges 12, 14 when assembled therebetween. However, in accordance with the invention the gasket 42 configuration provides a portion thereof which lies substantially flush along the longer dimension of the apertures 16, 18, and which is particularly positioned and of preselected width to thereby allow undisturbed transmission of microwave power through the waveguide coupling seal. It is to be realized that the profile or dimensions of the projection 46, and particularly its width, herein indicated by numeral 48, is determined by the frequency and the mode of radio-frequency power being transmitted through the waveguide system. That is, the dimensions 48 are essential in preventing unwanted modes from forming and propagating inside the coupling seal which would in turn, cause arcing and other power consuming perturbations. Thus, tailoring the dimensions of the projections 46 which lie flush along the surfaces of apertures 16, 18 allow not only a good electrical contact between the flanges for the proper conduction of current thereacross, but likewise provides an uninterrupted transition surface therebetween. Notice that when assembling the coupling of the invention with the gasket 42 of FIG. 3, it is not necessary to form the pump-out groove 36 in flange 14, since the projections 46 thereof do not create isolated regions and thus air spaces or pockets as do the strips 40 of the gasket of FIG. 2.

Notches 41 are formed into the outer circumference of the rings 39, 44 of gaskets 38, 42 respectively, along a diameter thereof which bisects both strips 40 in the case of gasket 38 or both projections 46 of gasket 42. Such notches are utilized as a means for precisely aligning the gaskets 38, 44 within the flanges 12, 14 prior to assembly thereof. Alignment with the flanges 12, 14 is provided by means of similar notches 43 formed into the outer circumferences of the flanges along a diameter which bisects the longer dimensions of the apertures 16, 18 therein. Alignment of the flanges and gasket when assembling the waveguide seal is effected by first, loosely assembling the bolts, gasket and flanges, and then placing a suitable length of dowel (not shown) of proper diameter along each of the combined configurations of notches 41 and notches 43, and thereafter tightening a strap (not shown) snuggly circumjacent about the flanges and dowels to drive them into alignment. The bolts 37 then are tightened with a torque wrench to properly tighten the flanges 12, 14 against the confined gasket.

Although the gaskets 38 and 42 are herein shown having the same general outside diameter as that of the flanges 12, 14, it is to be understood that the gasket outer diameter could be made slightly smaller than a diameter extending between the inside of the series of mounting bolts 37. Thus gasket would in this instance lie within the ring of bolts 37, and pins or other projections extending from opposite, matching holes in the facing flanges to pass through matching holes in the confined gasket to thus properly align the gasket within the flanges.

A waveguide coupling seal of the configuration shown in FIG. 1 was constructed with a flange diameter of 4.960 inches, and inside waveguide dimensions of 2.840 inches by 1.340 inches, which likewise were the dimensions of the apertures 16, 18. The flanges were formed of stainless steel and had a thickness of generally $1\frac{3}{16}$ inch. The steps 26, 30 were 0.035 and 0.019 inch respectively in height and were formed at an angle of 20° with the surfaces 24, 28 of the flanges. Gasket 38 was about 0.030 inch thick and was made of half-hard copper. The width of strips 40 was 0.125 inch and were spaced apart 1.350 inches. Flanges 12, 14 were tightened upon the gasket 38 by means of bolts 37 which were tightened to approximately 15 ft. lbs. The low power voltage standing wave ratio of the seal of FIG. 1 was equal to or less than 1.02 at a frequency of 2856 mc. per second. The waveguide seal provided optimum transmission therethrough of power levels of the order of 80 mw. peak and 40 kw. average. The seal provided a vacuum-tight joint to $10^{-8}$ torr each time is was assembled over a period of 20 assemblies with bolts 37 tightened to 15 ft. lbs. Accordingly, the seal provided not only good microwave power transmission characteristics therethrough, but likewise provided good vacuum sealing characteristics repeatedly over a number of closings utilizing the same flanges and new gaskets.

While the invention has been disclosed with respect to a specific embodiment and variations thereof, it will be apparent to those skilled in the art that numerous variations and modifications may be made within the spirit and scope of the invention and it is not intended to limit the invention except as defined in the following claims.

What is claimed is:

1. A microwave waveguide coupling for joining two lengths of waveguide in vacuum tight relation while simultaneously providing optimum high frequency microwave power transmission characteristics therethrough comprising:

(a) a first circular flange adapted to be sealed to one of said waveguides and having a rectangular central aperture therein;

(b) a second circular flange adapted to be sealed to the other of said waveguides and having a rectangular central aperture formed therein, said second flange being coaxially disposed in facing opposed relation to said first flange with said apertures in registering position;

(c) said first flange having a raised circular facing surface formed thereon, said raised surface extending radially outwardly to terminate in a depressed continuously circular slanted step;

(d) said second flange having a depressed circular facing surface formed therein, said depressed surface extending radially outwardly to terminate in a raised continuously circular slanted step wherein said raised step has a height less than the height of the raised surface of said first flange and a diameter slightly smaller than the diameter of the depressed continuously circular step of said first flange;

(e) gasket means disposed between said first and second flange, said gasket having an annular outer portion with inner portions integral thereof extending inwardly from the annular outer portion with the centermost edges thereof lying flush with said central apertures in compressed good electrical conduction relation;

(f) fastening means disposed generally along the outer periphery of said circular flanges to urge same together and clamp therebetween said gasket means; and (g) said flange surfaces with said gasket defining spaces therebetween and passageways in communication with said apertures for evacuation purposes.

2. The microwave waveguide joint according to claim 1 wherein said slanted steps are formed in said facing flanges with an angle ranging from 20 to 21 degrees in relation to a perpendicular to said facing flange surfaces.

3. A microwave waveguide coupling for joining two lengths of waveguide in vacuum-tight relation while simultaneously providing optimum high frequency microwave power transmission characteristics therethrough comprising:

(a) a first circular flange adapted to be sealed to one of said waveguides and having a rectangular central aperture therein;

(b) a second circular flange adapted to be sealed to the other of said waveguides and having a rectangular central aperture formed therein, said second flange being coaxially disposed in facing opposed relation to said first flange with said apertures in register;

(c) said first flange having a raised circular facing surface formed thereon, said raised surface extending radially outwardly to terminate in a depressed continuously circular slanted step;

(d) said second flange having a depressed circular facing surface formed therein, said depressed surface extending radially outwardly to terminate in a raised continuously circular slanted step wherein said raised step has a diameter slightly smaller than the diameter of the depressed continuously circular step of said first flange;

(e) gasket means disposed between said first and second flanges, said gasket comprising an annular outer ring of thickness greater than the height of said raised slanted step disposed along the region of and between said continuously circular slanted steps of said facing flanges and projections of deformable conductive material integrally secured at one end to the inner circumference of said ring portion and extending generally radially inward along a diameter of said ring portion to terminate in opposing parallel ends which lie substantially flush with the longest dimensions of said rectangular apertures and the spaces between said projections communicate with the smaller ends of said apertures; and (f) fastening means disposed about the outer periphery of said circular flanges to urge same together and clamp said gasket means in good electrical contact with said raised and depressed flange surfaces contiguous to said apertures and in vacuum sealing deformation state along said slanted steps of said flanges.

4. A microwave waveguide coupling for joining two lengths of waveguide in vacuum tight relation while simultaneously providing optimum high frequency microwave power transmission characteristics thereto comprising:

(a) a first circular flange adapted at one side to be sealed to one of said waveguides and having a rectangular central aperture formed therein;

(b) a second circular flange adapted at one side to be sealed to the other of said waveguides and having a rectangular central aperture formed therein; said second flange being coaxially disposed in facing relation to said first flange with said apertures in register;

(c) said first flange having a raised circular facing surface formed thereon, said raised surface extending radially outwardly from the center to terminate in a depressed continuously circular step;

(d) said second flange having a depressed circular facing surface formed therein, said depressed surface extending radially outwardly from the center to terminate in a raised continuously circular slanted step, wherein said raised step has a diameter slightly smaller than the diameter of the depressed continuously circular step of said first flange;

(e) said second flange having a continuous groove formed in the depressed circular facing surface along the outermost periphery thereof immediately adjacent said raised slanted step;

(f) a deformable metal gasket of thickness greater than the height of said raised slanted step disposed between said first and second flanges, said gasket having an anular outer ring portion disposed along the annular peripheral region of said flange and extending between said continuously circular slanted steps of said flanges and thin strip portions extending as substantially parallel chords across the inside circumference of said outer ring portion to lie substantially flush at their innermost edges with the longest dimension of said apertures of said flanges;

(g) fastening means disposed generally along the outer periphery of said circular flanges to urge same together and clamp therebetween said gasket providing a seal at said slanted steps with good electrical conduction contact between said flanges contiguous to said apertures; and (h) said flanges and gasket defining passageway spaces communicating with said groove and with the short dimension end of said apertures for evacuation.

References Cited by the Examiner

UNITED STATES PATENTS 2,860,311　11/58　Balian _____ 333—98
2,922,666　1/60　Lange et al. _____ 285—363

FOREIGN PATENTS 609,715　9/60　Italy.

ELI LIEBERMAN, *Primary Examiner.*

HERMAN KARL SAALBACH, *Examiner.*